Oct. 31, 1961  M. H. FARMER ET AL  3,006,749
METHOD FOR THE CONTROL AND DESTRUCTION
OF UNDESIRABLE VEGETATION
Filed Jan. 17, 1958
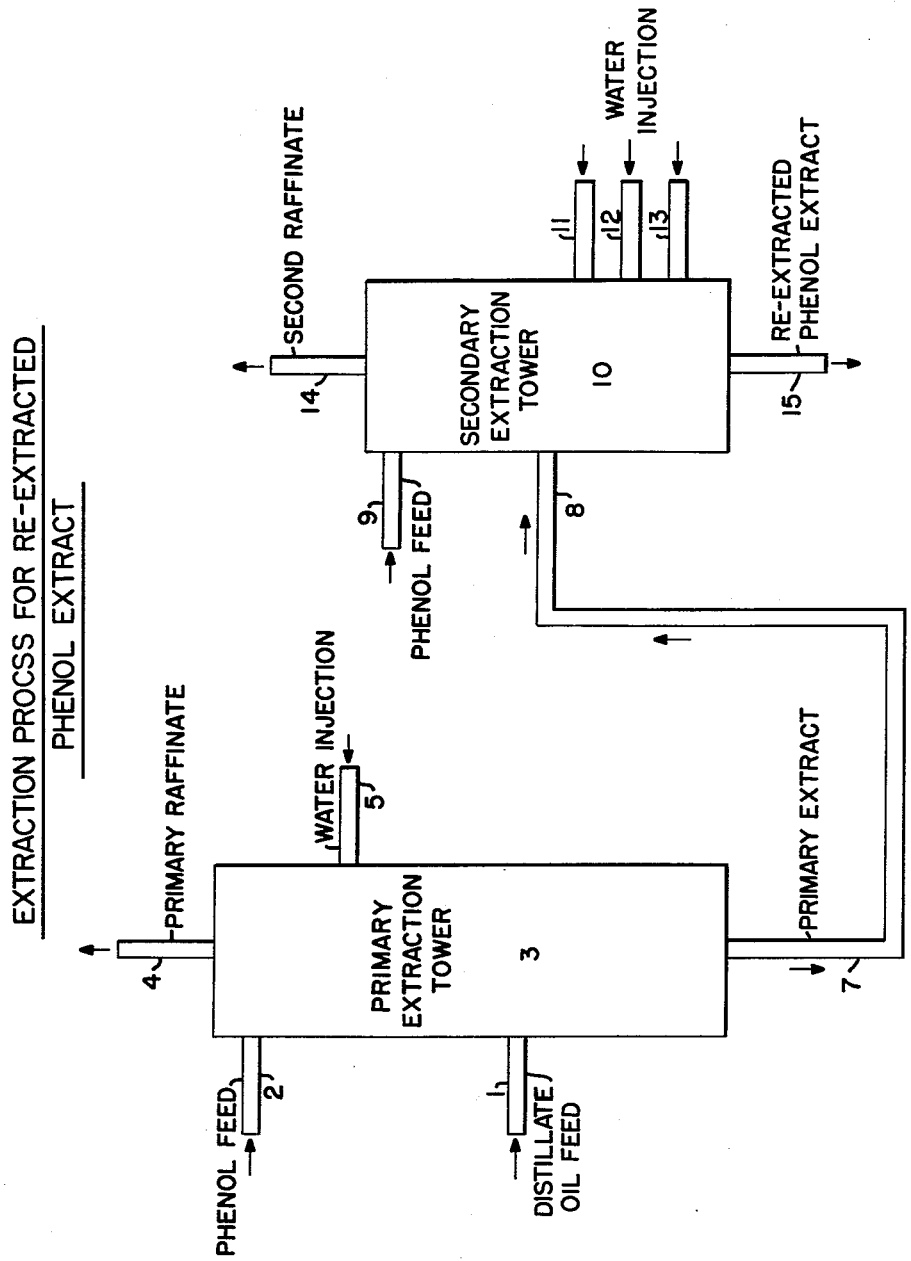
Michael H. Farmer
Robert Earl Emond  Inventors
By Henry Berk  Attorney

United States Patent Office
3,006,749
Patented Oct. 31, 1961

3,006,749
METHOD FOR THE CONTROL AND DESTRUCTION OF UNDESIRABLE VEGETATION
Michael H. Farmer, Roselle Park, N.J., and Robert Earl Emond, Mooretown, Ontario, Canada, assignors to Esso Research and Engineering Company, a corporation of Delaware
Filed Jan. 17, 1958, Ser. No. 709,526
1 Claim. (Cl. 71—2.3)

The present invention relates to novel compositions for the control and destruction of grasses and weeds. In particular this invention relates to the use of a low viscosity herbicide and soil sterilant of high density which may be applied to certain areas of soil where no vegetation is desired such as refinery firewalls, highway and railway rights-of-way, drainage ditches and irrigation canals. More specifically this invention relates to the use of a soil sterilant comprising a re-extracted phenol extract of relatively low volatility obtained in the production of transformer oil.

It is one object of this invention to provide an effective petroleum herbicide without the necessity of employing a phytotoxic additive. The use of weed killers and soil sterilants, both selective and general, is well known today. The known herbicides such as alkali borates, trichloroacetic acid, substituted ureas, various nitrogen compounds and many others have been applied in the form of dusts, aqueous suspensions, oil in water emulsions and with various organic solvents of relatively high volatility. Although various oils have been employed in conjunction with known herbicides efforts to find highly effective herbicides derived entirely from petroleum and suitable for general application have been unsuccessful.

Now it has been discovered that a certain extract of a naphthenic crude of relatively high sulphur content yields an outstanding soil sterilant highly phytotoxic and endowed with a capacity for retaining an appreciable degree of effectiveness well into the second year after application.

This extract, having a density greater than that of water and a viscosity suitable for spraying, is peculiarly suitable for the control of submerged weeds that grow along the sides and bottoms of drainage and irrigation systems. These weeds create a serious problem in that they tend to retard the flow of water. The high density of this extract causes it to sink and coat both the ditch and the submerged weeds growing therein. Oils less dense than water tend to float and become dispersed. Not only would the herbicidal effect of a lighter oil be lost where it is most needed but in the case of an irrigation system there would exist an ever present danger that the herbicide would be carried to the irrigated crops.

Extracts of the proper density and phytotoxicity for use as soil sterilants may be prepared by phenol extraction from a gas oil fraction obtained from a South American type crude of medium gravity. These crudes are referred to as naphthenic crudes and have a sulphur content higher than most United States crudes. The gas oil distillates from which the herbicide is extracted have a boiling range between 480° and 765° F. and a viscosity of 57 to 65, preferably 58 to 63 Saybolt seconds at 100° F. A further examination of the boiling range by Engler vacuum distillation reveals a typical fractional breakdown of this distillate in terms of volume percent distilled as follows:

5 vol. percent @ 555° F.
50 vol. percent @ 640° F.
95 vol. percent @ 735° F.

These temperatures have been corrected to 760 mm. pressure.

The extract to be employed as a soil sterilant is a concentrate of aromatics, naphthenes and heterocyclic sulphur compounds with mixed ring structures predominating. Although exact molecular description of this extract is impossible it may adequately be described and its composition limited by well know analytical tests for chemical and physical characteristics. Thus the final product of this invention may be defined as an extract from a gas oil distillate having properties within the following ranges:

| | |
|---|---|
| Gravity, ° A.P.I. @ 60° F.[1] | 6–10 |
| Refractive Index @ 140° F. | 1.5460–1.5600 |
| Viscosity @ 100° F. S.U.S. | 145–165 |
| Sulphur, wt. percent | 2.5–4.0 |
| Boiling range ° F. (5%–95%) @ 760 mm. | 530–770 |

[1] A.P.I. (American Petroleum Institute) gravity is an expression of density or the weight of a unit of material. The specific gravity is the ratio of the weight of a unit volume of matter to the weight of the same volume of water at a standard temperature. The specific gravity of an oil is always given at 60° F. referred to water at 60° F. Unless otherwise stated, both the specific gravity and the A.P.I. gravity refer to these constants at 60° F. The relation between the specific gravity and the A.P.I. gravity is $$°\text{A.P.I.} = \frac{141.5}{\text{sp. gr.}} - 131.5$$

or $$\text{Sp. gr.} = \frac{141.5}{\text{A.P.I.} + 131.5}$$

Although the extracts used in testing this invention were a second extract taken from the phenol extract obtained in producing transformer oil, i.e. a low cold test non-waxy lubricating oil, insofar as the product used in this invention is concerned there is no special significance in there being two extractions. Conditions and proportions may be controlled so as to obtain this product as the initial extract. This, however, would leave certain materials in the raffinate which lower its value as a transformer oil. Thus, the method of producing the product used in this invention and set forth in detail hereinafter in Example I merely sets forth the most practical method for industrial production. Other solvents such as furfural may be used instead of phenol if desired.

The extract employed in this invention is an outstanding herbicide when used alone as shown in Example I. However, if it be desired to use this product in conjunction with a known herbicidal additive the solvency of this extract is highly compatible with such a use. The following table shows that this re-extracted phenol extract has a high degree of solvency for pentachlorophenol. This latter chemical is sometimes used as a herbicidal agent in various carriers.

TABLE I

| Fraction | Percent Aromatics | Solubility at 77° F. (gms.) pentachlorophenol per 100 gms. solution |
|---|---|---|
| 1. Re-extracted phenol extract | 81 | 23.0 |
| 2. Catalytically cracked gas oil 400–650° F. distillation range | 60 | 14.0 |
| 3. Heavy Aromatic Naphtha | 85 | 18.5 |
| 4. Aromatic concentrate extracted from stove oil (350–500° F.) | 100 | 12.3 |

The process employed for producing the extract used in this invention may be more easily understood by reference to the accompanying drawing. Distillate oil feedstock is introduced through line 1 into the lower portion of a Primary Extraction Tower 3. Aqueous or anhydrous phenol in the range of 70 to 200 vol. percent based on oil feed is introduced near the top of the tower via line 2. One or more entry points for water injection are represented by line 5. Water employed in the range of 1 to 20 vol. percent based on oil feed is used as an antisolvent and in conjunction with temperature variation tends to control the solubility of the oil in the solvent phase which determines the proportions of raffinate and extract. Temperatures of 120 to 160° F., preferably 125 to 135° F., are maintained near the top of the tower graduating down to about 90 to 100° F. near the bottom. The raffinate, transformer oil, is removed overhead via line 4 and the primary extract is removed as bottoms via line 7. The primary extract is then conducted via line 8 to the Secondary Extraction Tower 10. Fresh aqueous or anhydrous phenol may be introduced at the upper part of the tower via line 9. Additional water is injected via lines 11, 12 and 13. By lowering the temperature as employed in the first extraction or increasing the percentage of water to feedstock the solubility of the oil in the phenol phase is decreased as desired to control the composition of the re-extract and remove as raffinate that portion of the initial extract unsuitable for use in the present invention. This second raffinate is removed via line 14 and the re-extract is removed as bottoms via line 15.

In an alternative process the primary extract from tower 3 may be stripped of phenol prior to introduction into Secondary Extraction Tower 10 with the entire solvent component employed in the second extraction being fresh aqueous or anhydrous phenol introduced via line 9.

If desired for purposes of increasing the capacity of the extraction towers a settling tank may be employed outside the tower in which the extract phase is allowed to separate into an oil phase and a solvent phase with or without additional water injection. The oil phase thus separated may then be recycled to the extraction tower.

The final oil extract comprising 8 to 16 vol. percent of the original distillate oil feed is separated from the phenol and water by a conventional steam stripping process.

Example I

In a continuous extraction process employing a stainless steel stacked stage extraction unit a distillate oil fraction from Tia Juana 102, a South American crude of medium gravity, having a viscosity of 58–62 Saybolt seconds at 100° F. and a boiling range of 480–765° F., was introduced at a feed rate of 73.5 to 75.0 cc./min. Temperatures in the unit were maintained in the range of 134–135° F. at the top being graduated down to a range of 99 to 101° F. at the bottom. Aqueous phenol was introduced at the rate of 79 to 161 vol. percent anhydrous phenol based on total oil feed. Water injection through multiple inlets was employed at the rate of 6.7 to 7.0 vol. percent based on oil feed. Water in 3 to 5 vol. percent based on the solvent was included in the solvent. The following runs were made under the procedure just described and within the limits therein set forth. The following table sets forth the details of each run.

TABLE II

| Run No. | 1 | 2 | 3 | 4 |
|---|---|---|---|---|
| Oil feed rate, cc./min. | 73.5 | 74.8 | 76.0 | 75.0 |
| Temperatures, ° F. Top | 134 | 135 | 134 | 135 |
| Oil Inlet | 112 | 109 | 107 | 110 |
| Bottom | 99 | 99 | 100 | 101 |
| Total Water Injection, vol. percent on Oil Feed | 6.8 | 7.0 | 6.7 | 7.0 |
| Water in Solvent, vol. percent on Solvent | 3.0 | 5.0 | 5.0 | 5.0 |
| Phenol Treat, vol. percent on Oil Feed | 166.0 | 122.0 | 101.0 | 83.0 |
| Phenol Treat (Anhydrous basis) vol. percent on Oil Feed | 161.0 | 116.0 | 96.0 | 79.0 |

The extract from these runs referred to herein as the primary extract was analyzed after steam stripping to remove the phenol and water and the following data were obtained.

TABLE III

| Run No. | 1 | 2 | 3 | 4 |
|---|---|---|---|---|
| Extract Yield, vol. percent on Oil Feed | 29.9 | 22.6 | 18.5 | 14.8 |
| Gravity, ° A.P.I. | 15.3 | 13.0 | 11.9 | 10.4 |
| Refractive Index at 140° F. | 1.5324 | 1.5331 | 1.5395 | 1.5449 |

Primary extract yields having characteristics within the ranges disclosed in Table III are suitable for re-extraction to produce the soil sterilant of the present invention.

The primary extract from run 4 was re-extracted under conditions employed in the initial extraction with one modification. Another 7 volume percent of water was added to the extract phase. The volume percent referred to is based on the volume of the extract phase from the primary extraction.

The re-extract was analyzed after steam stripping to remove the phenol and water and the following data were obtained:

TABLE IV

| | Primary Extract From Run No. 4 | Final Extract |
|---|---|---|
| Yield, vol. percent on Run No. 4 Extract | (100) | 80.6 |
| Yield, vol. percent on Distillate Feed to Primary Extraction Run No. 4 | 14.8 | 12.0 |
| Gravity, ° A.P.I. | 10.4 | 8.0 |
| Refractive Index at 140° F. | 1.5449 | 1.5552 |
| Viscosity at 100° F. S.U.S.ᵃ | | 155.6 |
| Viscosity at 210° F. S.U.S.ᵃ | | 38.8 |
| Viscosity Index | | −155 |
| Sulphur, wt. percent | | 3.28 |

ᵃ Saybolt Universal Seconds.

Example II

Re-extracted phenol extract prepared according to the process in Example I and having the following properties:

Gravity, ° A.P.I. _____ 8.0
Refractive Index at 140° F. _____ 1.5552
Viscosity at 100° F. S.U.S. _____ 155.6
Viscosity Index _____ −155
Sulphur, wt. percent _____ 3.28 was applied to three 10' x 10' plots on which were growing a lush crop of grass and weeds at the rate of 800 gallons per acre and on three replicated plots at the rate of 1600 gallons per acre. The same tests were made with other petroleum compositions consisting of fractionator bottoms, thermal tar, and control-cutback asphalt.

The term "fractionator bottoms" is used herein to designate a residual aromatic product from a catalytic cracker fractionator. To this heavy oil a 10% straight run naphtha was added as a diluent to reduce viscosity and to facilitate application by spraying.

The term "thermal tar" is used to refer to an aromatic oil product from thermal cracking of fractionator bottoms. Here also a 10% straight run naphtha was added as a diluent.

The term "cutback asphalt" is used to refer to a liquid asphalt produced by blending 40–60% straight run naphtha with 60–40% of 85–100 penetration pitch. This yields a fluid asphalt at room temperature having a Furol viscosity at 77° F. of 30 to 60.

Evaluations of the effects of these compositions as herbicides and soil sterilants were made at 2, 3, 4, 5, 12 and 13 months after application. The applications were made in June and July so that the evaluations made at 12 and 13 months were made in the heart of the second growing season after application.

Examination of the plots tested produced the following data:

What is claimed is:

The method of sterilizing soil which comprises applying to the soil at a rate of about 400 to 2000 gallons per acre a liquid consisting essentially of a phenol extract of a gas oil petroleum fraction, said fraction boiling in the range of about 480° to 765° F. and having a viscosity of about 57 to 65 Saybolt Universal seconds at 100° F., said extract having a viscosity at 100° F. in the range of 145 to 165 Saybolt Universal seconds, a refractive index at 140° F. in the range of 1.5460 to 1.5600, a gravity of at least 6° and not above about 10° A.P.I. and a sulfur content of 2.5 to 4 wt. percent.

TABLE V

| Treatment | Month Applied | Oil (gal./acre) | Percent of Area Sterilized [a] | | | | | |
|---|---|---|---|---|---|---|---|---|
| | | | 2 Mos. | 3 Mos. | 4 Mos. | 5 Mos. | 12 Mos. | 13 Mos. |
| 1. Fractionator Bottoms+(10% straight run naphtha). | July | 1,600 | 88 | 76 | 58 | | 0 | 0 |
| 2. Fractionator Bottoms+(10% straight run naphtha). | ---do---- | 800 | 65 | 35 | 17 | | 0 | 0 |
| 3. Thermal Tar+(10% straight run naphtha). | ---do---- | 1,600 | 90 | 83 | 68 | | 0 | 0 |
| 4. Thermal Tar+(10% straight run naphtha). | ---do---- | 800 | 72 | 42 | 12 | | 0 | 0 |
| 5. Control-Cutback Asphalt | ---do---- | 1,600 | 0 | 0 | 0 | | 0 | 0 |
| 6. Re-extracted Phenol Extract | June | 1,600 | | 90 | | | 75 | 35 | 15 |
| | ---do---- | 800 | | 65 | | | 65 | 20 | 5 |

[a] Each figure is the average of three replicated plots 10' x 10'.

References Cited in the file of this patent

UNITED STATES PATENTS

| | | |
|---|---|---|
| 1,877,614 | Stratford et al. | Sept. 13, 1932 |
| 2,160,929 | Warner et al. | June 6, 1939 |
| 2,215,359 | Livingston et al. | Sept. 17, 1940 |
| 2,261,287 | Read | Nov. 4, 1941 |
| 2,280,264 | Reeves | Apr. 21, 1942 |
| 2,414,640 | Fischer | Jan. 21, 1947 |
| 2,537,608 | Swaney et al. | Jan. 9, 1951 |
| 2,586,681 | McKay et al. | Feb. 19, 1952 |
| 2,600,436 | Shaw et al. | June 17, 1952 |
| 2,690,965 | Emond et al. | Oct. 5, 1954 |
| 2,698,276 | Francis | Dec. 28, 1954 |
| 2,717,854 | Felix | Sept. 13, 1955 |

OTHER REFERENCES

Bell et al.: in "Agricultural Chemicals," Apr. 1950, pages 31–35, 99 and 101.

Crafts et al.: in "California Dept. of Agriculture Bulletin," vol. 35, No. 1, pages 49–54, Jan.-Mar., 1946, Dept. of Agri.